United States Patent [19]

Horning

[11] Patent Number: 5,210,903
[45] Date of Patent: May 18, 1993

[54] FURNITURE CASTER STOP AND PROCESS OF IMMOBILIZING A CASTER

[76] Inventor: Jerry L. Horning, 1540 NE. 76th St., Seattle, Wash. 98115

[21] Appl. No.: 808,144

[22] Filed: Dec. 16, 1991

[51] Int. Cl.⁵ .......................... E02C 3/00; B60B 33/00
[52] U.S. Cl. ................................... 16/18 R; 248/352; 254/88
[58] Field of Search .......................... 248/352; 254/88; 16/18 R

[56] References Cited

U.S. PATENT DOCUMENTS

| | | | |
|---|---|---|---|
| 2,232,585 | 2/1941 | Albrich | 254/88 |
| 2,712,432 | 7/1955 | Thornton, Jr. | 254/88 |
| 3,752,441 | 8/1973 | Rogers | 254/88 |
| 3,870,277 | 3/1975 | West | 254/88 |

Primary Examiner—W. Donald Bray
Attorney, Agent, or Firm—Robert W. Beach

[57] ABSTRACT

The roller of a caster mounting an article of furniture is lodged in an upwardly opening diametral groove in a flat circular caster stop having a central aperture in such slot and opposed ramps in the slot sloping oppositely upward with a gentle incline onto which a caster roller can roll from such central aperture.

4 Claims, 1 Drawing Sheet

FURNITURE CASTER STOP AND PROCESS OF IMMOBILIZING A CASTER

BACKGROUND OF THE INVENTION

1. Field of the Invention

This invention relates to a stop for immobilizing a furniture caster to stabilize a caster-mounted article of furniture, particularly hospital beds, and to the process of stabilizing caster-mounted furniture by immobilizing its casters by the use of such stops.

2. Prior Art

In the past, some casters have been equipped with toe brakes which can be rocked to apply a braking force to a caster wheel for deterring or preventing rotation of the wheel about its axle, but such toe brakes do not prevent the wheel from swiveling about its upright axis. Because the wheel axle is offset a substantial distance horizontally from the upright swivel axis of the caster, swiveling of the caster about its upright axis, even without any rotation of the caster wheel about its axis, will enable an article of caster-mounted furniture to be shifted a substantial distance. Moreover, such toe brakes are often difficult to manipulate and may not effect sufficient braking of a caster wheel to prevent all rotation of such caster wheel on its axis. Also, it is easy for such a brake to be released without authorization.

Another expedient which has been used to immobilize a caster is to place it in a caster cup, which is a disk having an upstanding marginal flange for receiving the caster loosely. Such cup usually does not prevent some shifting of the caster-mounted furniture article by rotation of the wheel about its axis to some extent and in addition does not prevent the wheel from swiveling about the axis of the caster. Again, therefore, the caster-mounted article of furniture can be shifted to some extent even though the caster cup does not slide along the floor.

Wheel chocks have been used for immobilizing wheels in the past, but such chocks are usually utilized for immobilizing large wheels and particularly such wheels as have a resilient surface. Use of wheel chocks for immobilizing small wheels is not really practical, particularly if the periphery of the caster wheel is hard and smooth and especially where such a caster wheel rests on a smooth surface. Under such circumstances a wheel chock would be unreliable for immobilizing a caster wheel such as that utilized in mounting a hospital bed.

SUMMARY OF THE INVENTION

A principal object of the invention is to provide a stop which will be effective to immobilize a caster having a wheel with a hard smooth periphery when it is resting on a smooth surface.

Another object is to provide a stop for small caster wheels that can be installed in operative position quickly and easily and can also be removed quickly and easily from its installed condition.

Another object is to provide such a stop which is small, light and inexpensive to manufacture.

A further object is to provide a caster stop which will become effective to immobilize a caster when the caster-mounted article of furniture has been shifted only a very small, insignificant amount.

The foregoing objects can be accomplished by utilization of a stop in the form of a disk having a diametral slot between two parallel upright walls of a width slightly greater than the thickness of the wheel of a caster with which it is to be used and which slot has a central aperture between such walls through which the lower periphery of a caster wheel can engage a supporting surface beneath the stop when such wheel is received in such slot. The bottom of the slot is formed to provide opposed ramps sloping gently upward between the parallel upright walls from opposite sides of the central aperture to the periphery of the disk.

DETAILED DESCRIPTION

For the purpose of stabilizing an article of furniture mounted on casters, such as a hospital bed, for example, a plurality of the casters on which the article of furniture is mounted are individually immobilized by installing such individual casters in stops. The combined effect of immobilizing two or more casters is to stabilize the article of furniture, both from substantial translation or translatory shifting and from appreciable swinging of the article about one caster.

Figure 1:
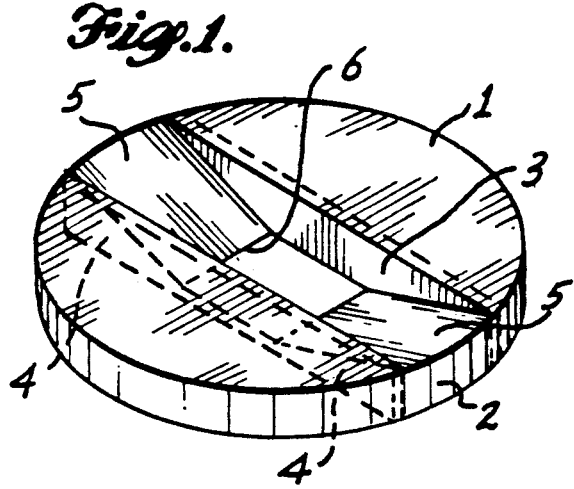
FIG. 1 is a top perspective of the stop of the present invention.
Figure 2:
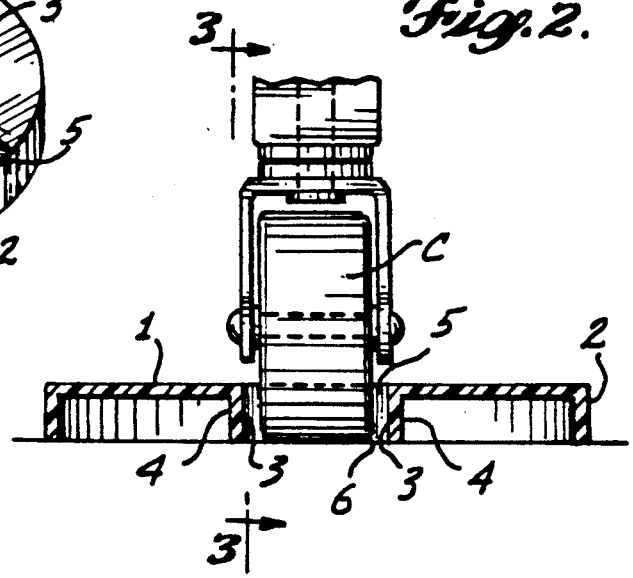
FIG. 2 is a central vertical section through the stop showing a caster lodged in the slot of the stop.
Figure 3:
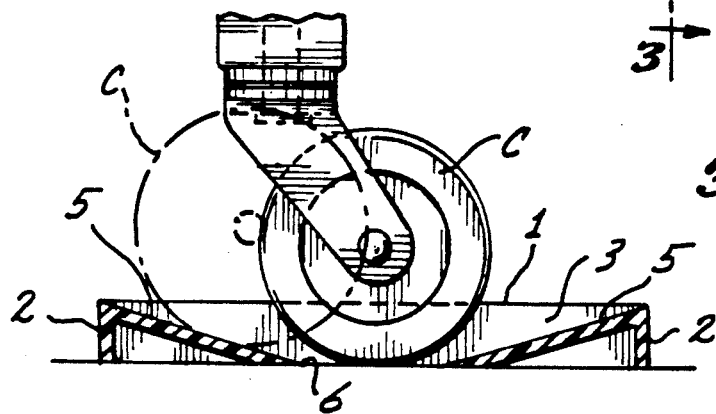
FIG. 3 is a vertical section through the stop taken on line 3—3 of FIG. 2.

The stop is a flat body 1 preferably in the form of a disk which also preferably is of shell construction having a generally continuous top wall from the margin of which a peripheral flange 2 shown in FIGS. 2 and 3 projects downward to establish the effective thickness of the disk. The upper portion of the disk has in it a diametral slot 3 between parallel upright walls 4 formed by parallel planar chordal flanges or webs projecting downward from the top of the disk to form opposite sides of the slot and downwardly opening recesses between such chordal webs and the peripheral flange 2. As shown in FIG. 2, the spacing between the walls 4 forming the slot 3 is sufficient to receive the wheel of the caster C in the slot with its axle extending transversely of and substantially perpendicular to the slot wall 4 to afford slight clearance between the opposite sides of the wheel and the respectively adjacent slots walls 4 as shown in FIG. 2.

Figure 4:
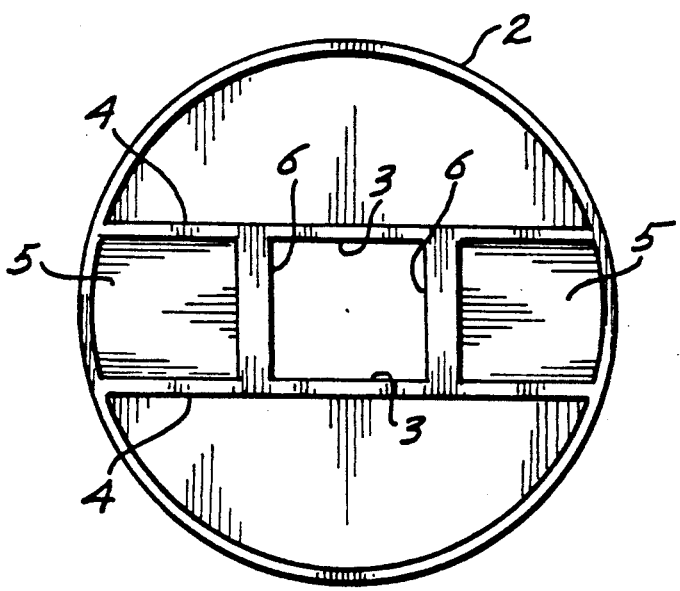
FIG. 4 is a bottom plan of the stop.

Oppositely inclined, opposed, gently sloping ramps 5 bridge between opposite end portions of the walls 4 forming the slot 3 which are inclined from spaced feather edges 6 at the bottom of the slot upward to the top of the peripheral flange 2 as shown in FIG. 3. The ramp edges 6 are spaced apart radially a distance to enable the lower periphery of the wheel to bear directly on the supporting surface through the aperture between the walls 4 and the ramp edges 6 as shown in FIGS. 3 and 4. As shown in FIG. 4, the spacing between the ramp edges 6 can be substantially equal to the width of the groove 3 so that the aperture in the bottom of the stop is approximately square.

As mentioned above, the ramps 5 have a gentle slope shown in FIG. 3 as being of the order of fifteen degrees to the top and bottom planes of the disk stop, but the inclination of the ramps could be within the range of ten degrees to twenty degrees relative to the top and bottom planes of the stop. Also, the ramps are shown as being planar. The slope of the ramps is such that the wheel of a caster C can roll from the portion of the supporting floor framed by the aperture 6 onto a ramp 5 easily but will be raised an appreciable distance quickly by rolling up the ramp.

In use the wheel of a caster C can be lodged in the groove 3 of the stop in the position shown in FIGS. 2 and 3 easily by lifting the caster and sliding the stop into place beneath it. To prevent appreciable swinging of the article of furniture about the swivel axis of the caster, another caster supporting the article of furniture should similarly be lodged in the slot of a stop. Preferably diagonally opposite casters supporting a hospital bed should thus be lodged in stops, but the other caster or casters of such a bed could also be lodged in a stop or stops. Because the caster wheel lodged in the stops are in registration with the stop apertures, all of the caster wheels engage the floor directly so that the bed or other article of furniture is supported in horizontal attitude whereas, if diagonally opposite casters were placed in caster cups, for example, the bed could rock about such diagonally located caster cups.

When a caster wheel is lodged in the slot 3 of a stop as shown in FIG. 2, a linear force applied to the article of furniture substantially parallel to the axle of the caster wheel would tend to slide the caster in scuffing fashion along the floor initially and then would cause the caster to swivel and turn the stop with it until the wheel axle is perpendicular to such force. When a linear horizontal force is applied to the bed or other article of furniture generally perpendicular to the axle of the caster wheel, the caster wheel will be rolled up a ramp 5 such as from the solid line position to the broken line position shown in FIG. 3. Rolling of the caster wheel onto a ramp would exert downward pressure on the ramp thus pressing the entire stop against the floor so as to lock the stop from sliding over the floor.

Rolling of the caster wheel up the ramp would also cause that part of the weight of the caster-mounted piece of furniture supported by the caster to exert a component of force down the ramp, tending to return the caster to the position shown in FIG. 3 and opposing displacement of the caster, and consequently of the part of the furniture supported by it, in the direction of ascent along the ramp. The caster would thus be effectively immobilized and displacement of the portion of the bed or other article supported by the caster would be very limited, so that the bed or other article of furniture would be stabilized quickly.

Particularly when a caster wheel has rolled somewhat up a ramp 5, such as to the broken line position shown in FIG. 3, application of force to the article of furniture to produce a force parallel to the axle of the caster wheel would not effect swiveling of the caster about its upright axis because the wheel tending to turn in the slot 3 would engage the spaced parallel upright walls 4 of such slot to prevent appreciable swiveling, and the force on the walls of the slot would not be able to rotate the stop because of the pressure of the stop on the floor caused by the pressure of the caster wheel on the ramp, which would fix the stop in place on the floor. Consequently, the leg mounted on the caster could not be displaced appreciably by the amount of swiveling which the caster could execute.

If more than two casters of a hospital bed, for example, are lodged in stops, such stops will be effective to prevent appreciable translation of the bed irrespective of the directional orientation of the various casters. If any caster is in a swiveled position other than that in which its roller axle is perpendicular to the direction of lineal force applied to the bed, such caster will immediately tend to swivel to a position in which the axle of its wheel is perpendicular to the direction of such force. In swivelling, the wheel will engage one or both of the walls 4 because of the small clearance between the wheel and such walls, as shown in FIG. 2, so that the stop will be rotated with the caster until the slot 3 is substantially aligned with the direction of force. Such force will then cause the caster wheel to roll up a ramp 5 a short distance as described above to produce a force resulting from the weight of the caster on the ramp opposite to the direction of displacement force to terminate movement of the bed after it has been displaced only a small amount.

I claim:

1. A furniture caster stop for immobilizing a caster on which an article of furniture is mounted, comprising a flat body having two spaced parallel upright walls forming an upwardly opening slot therebetween for receiving the wheel of a furniture-mounting caster with its axle extending transversely of said slot, and said slot between said walls having a width slightly greater than the axial thickness of such wheel, said slot having an aperture in its bottom between said walls for enabling the wheel of a caster received in said slot to engage and rest on the floor through said aperture, and said body having opposed ramps sloping oppositely upward from said aperture for engagement of either ramp by a caster wheel rolling from the floor out of said aperture.

2. The furniture caster stop defined in claim 1, in which the body is of shell construction and includes a marginal flange extending downward to the bottom of the stop.

3. The furniture caster stop defined in claim 1, in which the body is circular and the slot extends diametrally of the body.

4. The process of stabilizing an article of furniture mounted on casters resting on the floor to deter appreciable shifting of such article over the floor, which comprises substantially immobilizing at least two caster supporting such article of furniture by confining the wheel of each of such casters between parallel walls spaced apart slightly farther than the width of the caster wheel and opposed spaced ramps onto one of which ramps the caster wheel can roll from the floor between the opposed spaced ramps by application of a displacing force to such article of furniture in any direction and thereby applying a downward force on such a ramp to hold such ramp in fixed position, and by such rolling of a caster wheel up a ramp producing a component of force on the caster in a direction opposite the displacing force and tending to roll its wheel down the ramp.

* * * * *